United States Patent
Belogolovy

(10) Patent No.: US 9,949,219 B2
(45) Date of Patent: Apr. 17, 2018

(54) POWER HARVESTING

(71) Applicant: INTEL CORPORATION, Santa Clara, CA (US)

(72) Inventor: Andrey Belogolovy, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 119 days.

(21) Appl. No.: 14/971,167

(22) Filed: Dec. 16, 2015

(65) Prior Publication Data

US 2017/0181110 A1  Jun. 22, 2017

(51) Int. Cl.
| | |
|---|---|
| H04W 52/54 | (2009.01) |
| H04W 52/58 | (2009.01) |
| H04L 5/00 | (2006.01) |
| H04W 72/04 | (2009.01) |
| H04W 4/00 | (2018.01) |
| H02J 7/02 | (2016.01) |

(52) U.S. Cl.
CPC ............. *H04W 52/58* (2013.01); *H02J 7/02* (2013.01); *H02J 7/025* (2013.01); *H04L 5/0055* (2013.01); *H04W 4/008* (2013.01); *H04W 72/0406* (2013.01); *H04W 72/048* (2013.01); *H04W 72/0473* (2013.01)

(58) Field of Classification Search
CPC ............. H04W 52/54; H04W 72/0473; H04W 72/048; H04W 72/0406; H04W 4/008; H02J 7/02; H02J 7/025; H04L 5/0055
See application file for complete search history.

(56) References Cited

U.S. PATENT DOCUMENTS

| | | | |
|---|---|---|---|
| 8,822,924 B2* | 9/2014 | Valentino | G01J 1/0488 250/336.1 |
| 9,063,165 B2* | 6/2015 | Valentino | G01P 13/00 |
| 9,107,579 B2* | 8/2015 | Greene | H02J 7/025 |
| 2012/0316414 A1* | 12/2012 | Greene | A61B 5/0024 600/365 |

(Continued)

FOREIGN PATENT DOCUMENTS

WO    2015034495 A1    3/2015

OTHER PUBLICATIONS

Stevens et al., "White Paper: The Benefits of 60 GHz Unlicensed Wireless Communications," Dec. 2011, available online at <www.Sub10 Systems Limited, http://www.sub10systems.com/wp-content/uploads/2011/03/White-Paper-Benefi- ts-of-60GHz.pdf>. (10 pages).

(Continued)

*Primary Examiner* — Brian O'Connor
(74) *Attorney, Agent, or Firm* — Patent Capital Group

(57) ABSTRACT

Techniques for forming a wireless RF power harvesting and data network are described. An example electronic device includes an antenna array, a processor, and instructions to direct the actions of the processor. The instructions control the processor to perform a registration process for a power harvesting device. The registration process is to obtain information that enables the transmission of a targeted power packet to the power harvesting device through beamforming. The instructions also direct the processor transmit the targeted power packet to the power harvesting device.

22 Claims, 5 Drawing Sheets

(56) References Cited

U.S. PATENT DOCUMENTS

| | | | | |
|---|---|---|---|---|
| 2013/0288600 | A1* | 10/2013 | Kuusilinna | H02J 7/0004 |
| | | | | 455/41.2 |
| 2015/0023204 | A1* | 1/2015 | Wik | H04W 48/14 |
| | | | | 370/254 |
| 2015/0338525 | A1* | 11/2015 | Valentino | G01J 1/0219 |
| | | | | 250/395 |
| 2016/0091920 | A1 | 3/2016 | Belogolovy | |
| 2017/0041915 | A1* | 2/2017 | Gupta | H04L 5/0055 |
| 2017/0085120 | A1* | 3/2017 | Leabman | H02J 7/042 |
| 2017/0085127 | A1* | 3/2017 | Leabman | H02J 17/00 |

OTHER PUBLICATIONS

Ishizaki, Haruya et al., "A battery-less WiFi-BER modulated data transmitter with ambient radio-wave energy harvesting", 2011 Symposium on VLSI Circuits Digest of Technical Papers, IEEE 978-4-86348-165-7 (2011) (2 pages).

* cited by examiner

100

POWER HARVESTING

TECHNICAL FIELD

This disclosure relates generally to techniques for wirelessly powering devices. Specifically, this disclosure relates to communication protocols for simultaneous power and data transmission.

BACKGROUND

As computer miniaturization progresses more and more products will be equipped with some form of sensing, computing, wireless communication abilities. The networking of objects through embedded electronics is sometimes referred to as Internet of Things (IoT). Electronics for enabling IoT can be embedded into a variety of objects, such as watches, bracelets, pens, keys, badges, and flash drives. Electronics such as sensors may be embedded in walls, furniture, pipes, and other area where there may not be easy physical access to the device.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for power harvesting. As mentioned above, electronics are increasingly being embedded in a wide variety of objects, such as IoT devices and wearable electronics. In such devices, operating power is used for sensing, processing, and data transmission. Considering the increasing number of such objects and the possibility that some objects may not be easily accessible, powering the electronics in these objects may be cumbersome. For the electronics in IoT devices and wearables, Radio Frequency (RF) power harvesting techniques may be used to avoid the use of battery.

The present disclosure describes a communication protocol that can be used provide simultaneous power and data transmission between power harvesting devices and a data collection hub. The hub can locate a power harvesting device and then form a directed transmission of data together with an energy packet that is intended specifically for the identified power harvesting device. By directing the RF energy at a specific identified power harvesting device, the use of that RF energy can be harvested more efficiently.

Figure 1:
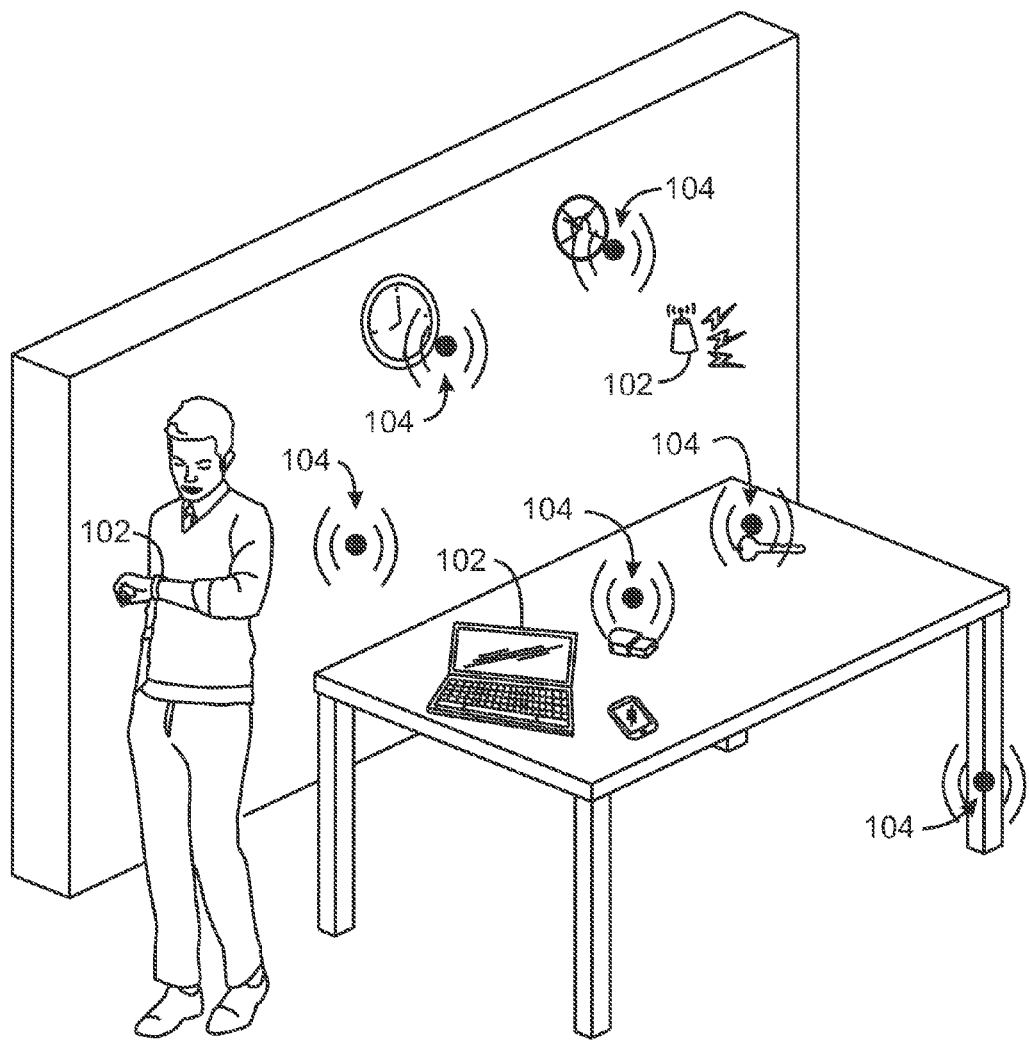
FIG. 1 is an illustration of a group of devices that may be configured to form a data and power harvesting network.

FIG. 1 is an illustration of a group of devices that may be configured to form a data and power harvesting network.

FIG. 1 shows two types of devices, referred to herein as hubs 102 and harvesters 104. The hubs 102 transmit wireless power through RF energy and the harvesters 104 harvest the power transmitted by the hubs 102. The hubs 102 will be relatively large form factor devices that have a relatively powerful battery and/or are connected to a powerline. Examples of hubs 102 include a laptop, a desktop computer, a tablet computer, a smartphones, a smart watch, a wireless network access device such as a router or modem, and the like.

The harvesters 104 are relatively small form factor devices that may not be equipped with a battery or configured to receive power from a power line. The harvesters 104 may be embedded in any number of objects, including home appliances such as a wall clock, light bulb, light switch, smoke detector, thermometer, barometer, or thermostat. The harvesters 104 may also be embedded in personal items, such as keys, thumb drives, a wallet, and others. The harvesters 104 may also be sensors embedded in furniture or the house infrastructure. The types of objects that may include a harvester 104 is not limited by the list of objects provided herein. Each harvester 104 may be configured to collect and report a particular type of information, including, but not limited to, environmental conditions such as pressure and temperature data, time, location, air quality, status of an object, and others.

Other examples of harvesters 104 may include wearable electronics such as smartwatches, fitness trackers, and others. It should be noted that the characterization of a device as a hub 102 or a harvester 104 is not necessarily dependent on the type of object that the device is coupled to. For example, a device such as a smartwatch may be configured as either a hub 102 or a harvester 104. Some or all of the harvesters 104 may IoT devices. However, the techniques described herein are not limited to IoT devices.

The present description may be described from the perspective of a single hub. However, it will be appreciated that the data and power harvesting network may include a single hub or multiple hubs operating simultaneously. Each hub 102 may be configured to perform a discovery and registration process to identify the harvesters 104 within its communications range. Each harvester 104 may transmit identifying information to the hub 102 to enable the hub 102 to target specific harvesters 104 with directed data and power delivery. The harvesters 104 can also send status and/or measurement information depending on the particular type of data that the harvester 104 is configured to gather.

To periodically execute the discovery and registration process and after registration, the hub 102 will transmit energy packets to the various harvesters 104. The energy packet can be a specific preamble with a given duration that that enables the device to harvest enough power for the rest of communication cycle. In some examples, the energy packet can be a non-modulated predefined waveform that the power harvesting device can use for backscattering, i.e., re-radiation based transmission.

The hub 102 can also identify the physical locations of the harvesters 104. In some examples, the location may be provided by the harvester 104, which transmits location information to the hub 102. In some examples, the location of a harvester 104 is determined by the hub 102 based on characteristics of the signal received from the harvester 104. Identifying the direction of a harvester 104 enables the hub 102 to target the harvester 104 with a directed beam of energy.

To provide directional power transmission, the hub 102 can include a directional transmitter that can be adjusted to direct transmissions of data and power in a specified direction. For example, in an antenna array, the relative phase and amplitude of each radiator in the array can be adjusted to focus the beam of energy toward the location of the targeted harvester 104. The hub 102 may transmit power and data at an unlicensed frequency, for example, 2.4 GigaHertz (GHz), 24 GHz, or 60 GHz. Higher transmission frequencies will generally result in smaller beam width and, thus, more efficient power transmission with less wasted power. Table 1 below provides an example of beam widths that can be accomplished for a 30 centimeter (cm) diameter antenna.

TABLE 1

Beam Width for Several Unlicensed Frequency Bands For 30 cm diameter antennas.

| Frequency | 99.9% beam width |
|---|---|
| 2.4 GHz | 117 degrees |
| 24 GHz | 12 degrees |
| 60 GHz | 4.7 degrees |

The location of a particular harvester 104 may be provided by the harvester 104 itself or may be determined by the hub 102. For example, the location of the harvester 104 can be pre-programmed into the harvester 104 by a user or the harvester 104 may include circuitry that enables it to sense and periodically update its location. Such circuitry may include a Global Position System (GPS), triangulation of wireless signals, and others.

The hub 102 may be configured to determine a relative location of a particular power harvester 104 based on characteristics of the signal received from the power harvester 104, rather than information encoded in the signal. For example, the phase and amplitude of the signal received from the harvester 104 will generally be different for each antenna in the antenna array, depending on the relative location of the harvester 104 with respect to the individual antennas. The phase an amplitude information may be used to compute an approximate location. In some examples, the same relative phase and amplitude measured for each antenna can be also used as beamforming parameters to focus the beam of energy in the same direction from which it was received. The antenna array will include at least two antennas and can include any suitable number of antennas. The greater the number of antennas in the antenna array, the more narrowly the beam can be focused. For 60 GHz, the antenna array may include 16 or 32 antennas.

In the data and power harvesting network, there could be dozens of power harvesting devices within the communication range of the hub 102. The protocol described herein enables the hub 102 to identify and determine a location for individual harvesters. In this way, the wireless transmission of power can be focused at each harvester 104 individually. Features of the communication protocol are described further in relation to FIG. 2.

The block diagram of FIG. 1 is not intended to indicate that the data and power harvesting network are to include all of the components shown in FIG. 1. Further, the data and power harvesting network may include any number of additional components not shown in FIG. 1, depending on the details of a specific implementation.

Figure 2:
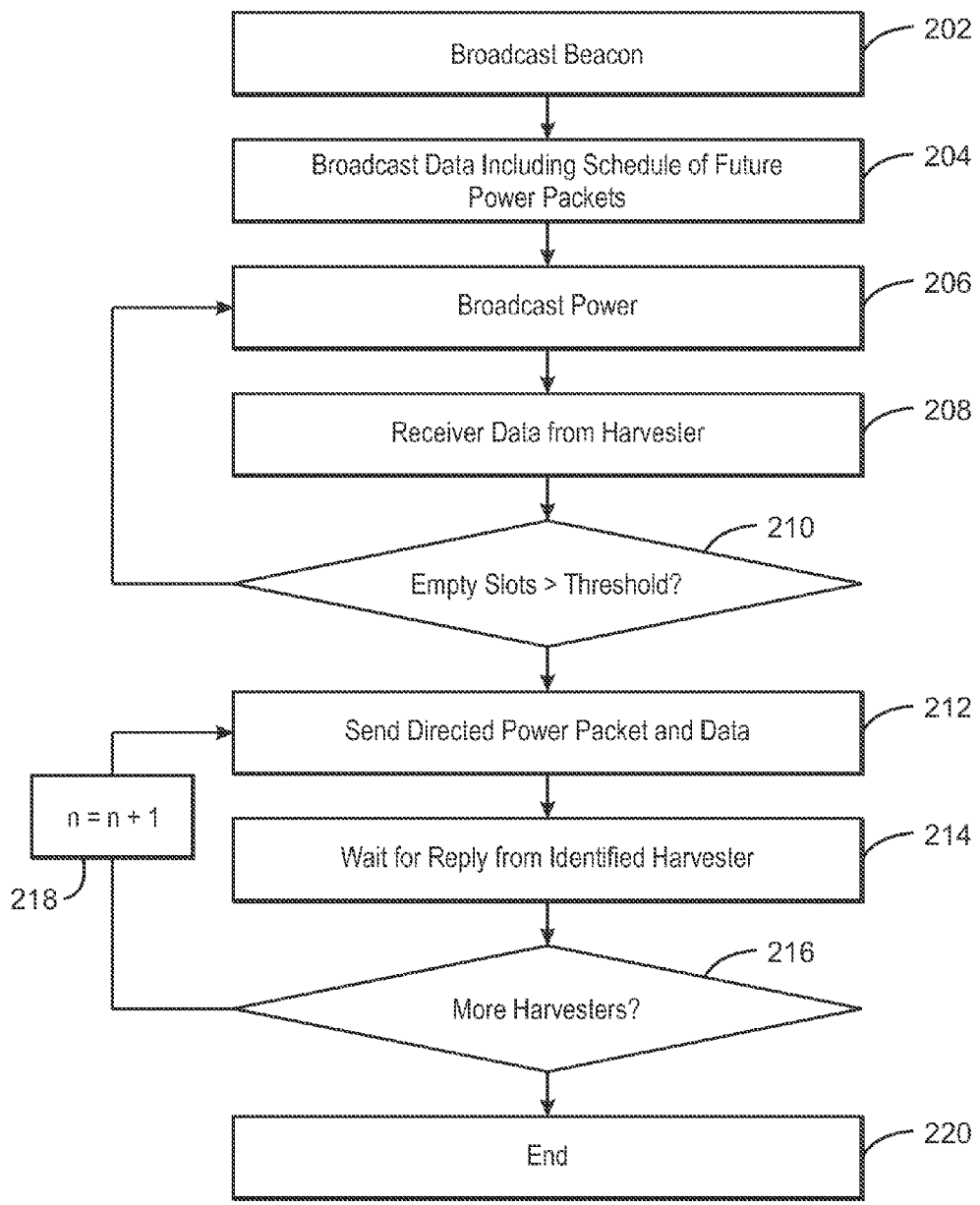
FIG. 2 is a process flow diagram of a method of establishing a joint data and power transmission network.

FIG. 2 is a process flow diagram of a method of establishing a joint data and power transmission network. The method may be performed by a hub, such as one of the hubs 102 shown in FIG. 1. The method may begin at block 202.

At block 202, the hub broadcasts a beacon. The beacon wakes the harvesters within range and provides enough RF energy to enable the harvesters to communicate with the hub during the registration process. The beacon is not aimed at any particular target. In some examples, beamforming may not be used during the broadcast of the beacon, and the beacon may be broadcast in an omnidirectional pattern. However, other radiation patterns are also possible. For example, if the hub is a wireless router, beamforming may be used to direct the energy in a manner such that the entire room is covered while less energy is radiated upward or in other directions where harvesters are unlikely to be.

At block 204, the hub send broadcast of data including a schedule of future power packets. The data broadcast by the hub at this time may also include other data, including identifiers such as Internet Protocol (IP) addresses and Media Access Control (MAC) addresses. Identifiers may also include information about the device type, for example, whether the device is a temperature sensor, a pressure sensor, a humidity sensor, and so forth. The data broadcast by the hub can also include parameters describing properties of the hub, such as number of antennas, maximum transmission power, maximum number of users that can connect, operation schedule (who should transmit and when) that was already prepared, and others. The schedule describes the timing for future power packets and idle time slots in which the harvesters can respond. An example of such a schedule is described in relation to FIG. 3.

At block 206, the hub broadcasts a power waveform to be harvested. As in block 202, the power waveform broadcast at block 206 is not aimed at a particular harvester.

At block 208, the hub attempts to receive data from a harvester. To do this, the hub enters an idle period in accordance with the broadcast schedule and listens for a response by a harvester. At this time, there is no information about the number of harvesters in the area, so there is no schedule for them. In some examples, the harvesters use random timeslot selection and exponential back off principle to transmit their identifiers in a selected timeslot, so collisions may happen.

The data received from a harvester may include a unique identifier of the harvester. For example, the identifier may be a 16 bit integer number similar to IP address in IPv6 protocol. Upon receipt of an identifier, the hub can assign that time slot to the corresponding harvester. If the hub successfully receives and decodes the identifier of a harvester, then in the next power waveform for harvesting (block 206), the hub transmits the decoded identifier. The identified harvester, upon receiving the identifier from the hub, can treat it as a confirmation of successful registration with the hub.

The hub also determines a location of the identified harvester and stores the location information for future communications with the harvester. In some examples, the location is determined by receiving location data from harvester. In some examples, the location is determined by the hub through analysis of the received.

Because the harvesters select the time slots randomly, several time slots may be empty meaning that no harvester selected that time slot for responding. In some examples, the hub can count the number of empty time slots and use the count as an indication of whether all of the harvesters in the area have been registered. If no harvester responds in a particular time slot, the hub may increase the count by one. The process flow may proceed to block 210 after processing the data received from the harvester or after expiration of the idle time if no harvester responds in that time slot.

At block 210, the hub determines whether the number of empty time slots is greater than threshold number. The threshold may be selected based on the design considerations of a particular embodiment. Generally, the threshold will be a large enough number to enable all of the harvesters to respond. For example, the threshold may be approximately 200.

If the number of time slots is less than the threshold, the process flow advances to block 206. At the next iteration of block 206, the hub includes the most recently decoded harvester identifier. If the number of time slots is greater than the threshold, the process flow advances to block 212. At this stage, all of the harvesters in the area are registered and have an assigned time slot. Also, the hub has determined the location of each harvester and/or the beamforming parameters that will be used for directing future communications and power packets at selected harvesters.

At block 212, the hub sends a directed data and power packet. The power packet is a long duration waveform that is modulated with a single harvester identification number. The identification number identifies the harvester so that the harvester will be triggered to respond in the next time slot. The transmission of the power packet and the data can be directed to the targeted harvester through beamforming, based on the location data or beamforming parameters stored for that particular harvester. The data may be encoded in the power packet or the data may be encoded in a separate data packet that follows the power packet. If the data is transmitted in a separate data packet, the data packet may be transmitted using lower power than the power packet intended for harvesting. The targeted harvester harvests the RF energy directed to it and decodes any received data.

At block 214, the hub pauses and waits for a response from the targeted harvester. The harvester may or may not respond with a data transmission to the hub. If the harvester responds, the data may include the sensed information or status information that the harvester is designed to provide. For example, in the case of a thermometer, the data may include temperature data. The data may also include data used to facilitate communications with the harvester. For example, the harvester may provide information on signal quality, power budget for harvesting, and others. The process flow may proceed to block 216 after processing the data received from the targeted harvester or after expiration of the idle time if the harvester does not respond.

At block 216, the hub determines whether there are additional harvesters that have been registered. If there are no additional harvesters, the method advances to block 220 and ends. If there are additional harvesters, the method advances to block 218.

At block 218, time slot identifier, n, is incremented and harvester information is obtained for the harvester registered for that time slot, including the beamforming information, harvester identifier, and the like. The process flow then advances to block 212, wherein the hub sends a directed data and power packet to the new harvester.

The method 200 should not be interpreted as meaning that the blocks are necessarily performed in the order shown. Furthermore, fewer or greater actions can be included in the method 200 depending on the design considerations of a particular implementation.

Figure 3:
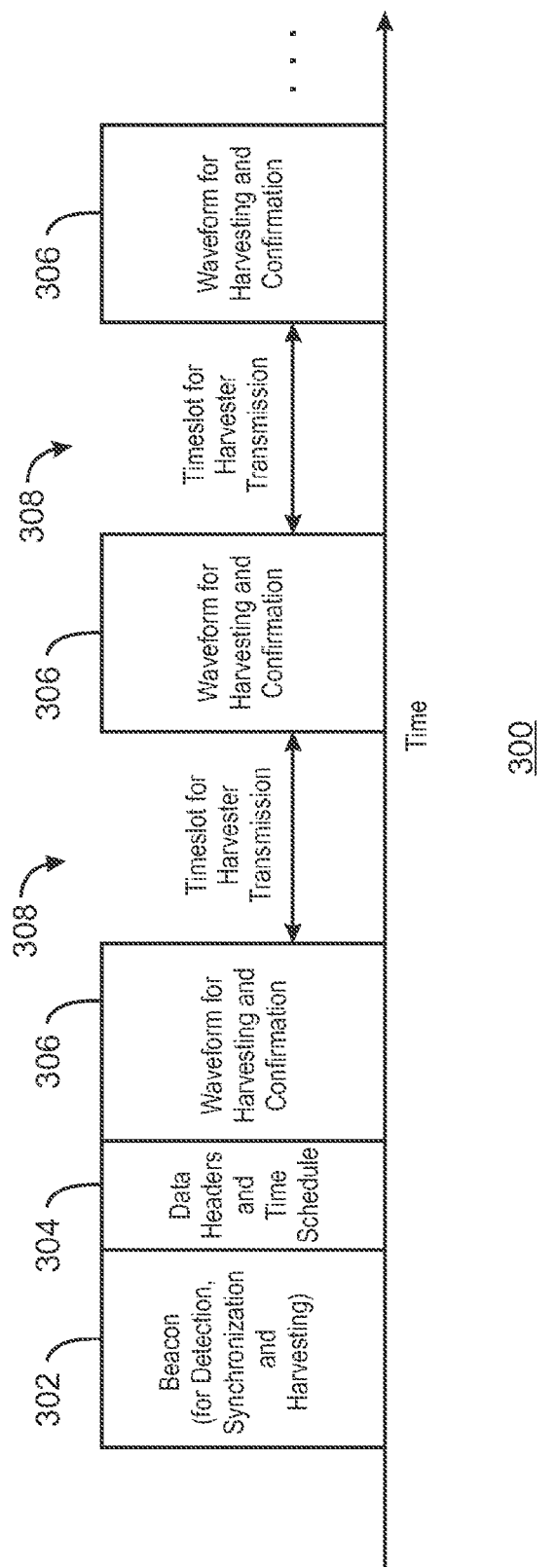
FIG. 3 is a timing diagram showing an example broadcasting transmission schedule used for registration of harvesters.

FIG. 3 is a timing diagram showing an example broadcasting transmission schedule used for registration of harvesters. The time slots 302 to 308 correspond with blocks of the method 200 shown in FIG. 2.

As shown in FIG. 3, the registration process starts at block 302 with the beacon transmission by the hub. The beacon 302 is discussed above in relation to block 202 of FIG. 2. As described above, the beacon wakes the harvesters within range and provides enough RF energy to enable the harvesters to communicate with the hub during the remainder of the registration process.

At block 304, the hub transmits the time schedule as described above in relation to 204. The time schedule defines the timing of time slots 306 and time slots 308. At each time slot 306, a power waveform is broadcast for power harvesting and any confirmation identifiers are broadcast as described in blocks 206. At each time slots 308, the hub is idle and waiting for a response from a harvester as described above in relation to block 208 of FIG. 2.

Time slots 306 and 308 repeat until the end of the registration process. Each of the transmissions by the hub shown in FIG. 3 are broadcast, meaning that they are not directed to one specific harvester. The timing diagram 300 should not be interpreted as meaning that the time slots are drawn to scale. Furthermore, fewer or additional actions can be included in the timing diagram 300 depending on the design considerations of a particular implementation.

Figure 4:
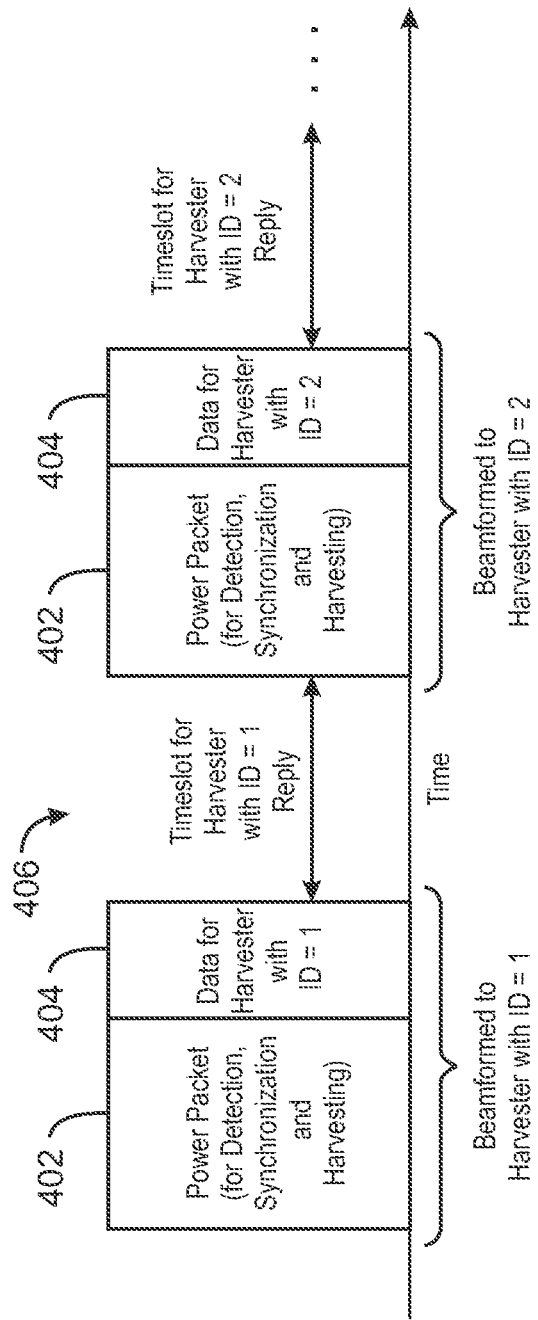
FIG. 4 is a timing diagram showing an example transmission schedule used for communicating with the harvesters after they have been registered.

FIG. 4 is a timing diagram showing an example transmission schedule used for communicating with the harvesters after they have been registered. The time slots 402 to 406 correspond with blocks of the method 200 shown in FIG. 2.

As shown in FIG. 4, the communication with a particular harvester is initiated by the time slots 402. At time slots 402, a directed power packet is transmitted to a selected harvester as described in block 212 of FIG. 2. As described above, the power packet is targeted at the location of the harvester through beamforming. The targeted harvester then harvests the power transmitted by the hub in the power packet. In some examples, the identifier of the targeted harvester is encoded in the power packet.

At the time slots 404, the hub transmits data for the targeted harvester as described above in relation to 212 of FIG. 2. The data can include the identifier of the targeted harvester and can also include additional information. In some examples, the time slot 404 is eliminated, and any data to be transmitted to the targeted harvester is included in the power packet.

At time slots 406, the hub is idle and waits for a reply from the targeted harvester as described in block 214 of FIG. 2. Time slots 402 to 406 repeat until the each registered harvester has responded. Each of the transmissions by the hub shown in FIG. 4 are targeted, meaning that beamforming is used to direct the power to the location of one specific harvester. The timing diagram 400 should not be interpreted as meaning that the time slots are drawn to scale. Furthermore, fewer or additional actions can be included in the timing diagram 400 depending on the design considerations of a particular implementation.

Figure 5:
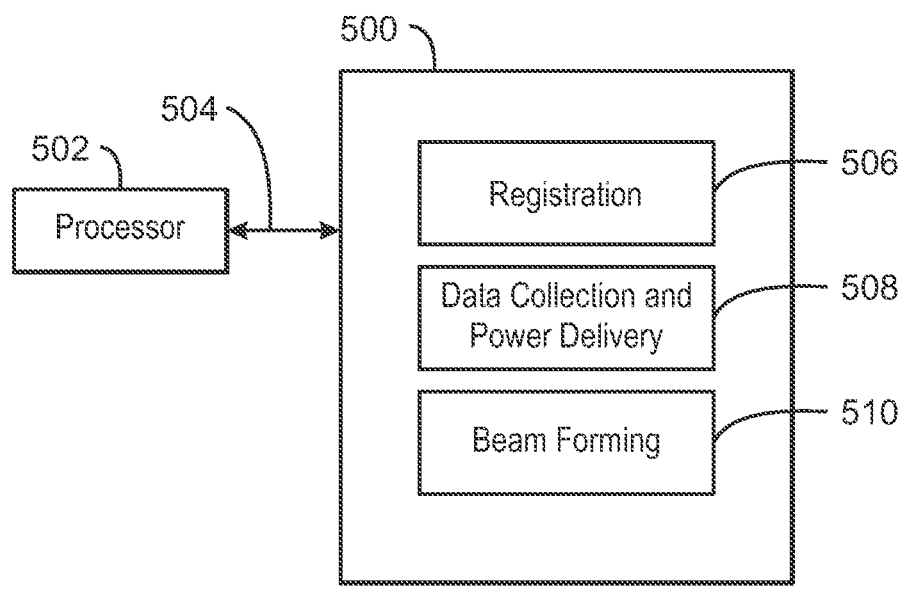
FIG. 5 is a block diagram showing a medium that contains logic for forming a data and power harvesting network as described herein.

FIG. 5 is a block diagram showing a medium 500 that contains logic for forming a data and power harvesting network as described herein. The medium 500 may be a computer-readable medium, including a non-transitory medium, that stores code that can be accessed by a processor 502 over a computer bus 504. For example, the computer-readable medium 500 can be volatile or non-volatile data storage device. The medium 500 can also be a logic unit, such as an Application Specific Integrated Circuit (ASIC), a Field Programmable Gate Array (FPGA), or an arrangement of logic gates implemented in one or more integrated circuits, for example. In some examples, the medium is included in a device that can operate as a hub.

The medium 500 may include modules configured to perform the techniques described herein. For example, a registration module 506 may be configured to perform a discovery process to identify the power harvesters in the area. A data collection and power delivery module 508 may be configured to deliver targeted power packets to selected harvesters and collecting data from the harvesters. A beamforming module 510 may be configured to control the parameters of an antenna array to shape and target the beam radiated by the antenna array. In some embodiments, the modules 506-510 may be modules of computer code configured to direct the operations of the processor 502.

The block diagram of FIG. 5 is not intended to indicate that the medium 500 is to include all of the components shown in FIG. 5. Further, the medium 500 may include any number of additional components not shown in FIG. 5, depending on the details of the specific implementation.

EXAMPLES

Example 1 is an electronic device to provide a wireless RF power harvesting and data network. The electronic device includes an antenna array; a processor; and a controller to control the processor to: perform a registration process for a power harvesting device to obtain information that enables transmission of a targeted power packet to the power harvesting device through beamforming; and transmit the targeted power packet to the power harvesting device.

Example 2 includes the electronic device of example 1, including or excluding optional features. In this example, the information that enables transmission of the targeted power packet to the power harvesting device through beamforming is location information received from the power harvesting device.

Example 3 includes the electronic device of any one of examples 1 to 2, including or excluding optional features. In this example, the information that enables transmission of the targeted power packet to the power harvesting device through beamforming is characteristics of a signal received by the antenna array from the power harvesting device.

Example 4 includes the electronic device of any one of examples 1 to 3, including or excluding optional features. In this example, the registration process includes broadcasting a schedule of time slots to be used by the power harvesting device. Optionally, the power harvesting device randomly selects one of the time slots to send power harvester identification information to the electronic device. Optionally, prior to each of the time slots, the electronic device broadcasts a power waveform to power the power harvesting device. Optionally, the power harvester identification information received during a previous one of the time slots is encoded in the power waveform.

Example 5 includes the electronic device of any one of examples 1 to 4, including or excluding optional features. In this example, the electronic device is a wireless network access device.

Example 6 includes the electronic device of any one of examples 1 to 5, including or excluding optional features. In this example, the electronic device is a device selected from a group that includes a laptop computer, a desktop computer, a tablet computer, and a smart phone.

Example 7 includes the electronic device of any one of examples 1 to 6, including or excluding optional features. In this example, the power harvesting device is a wearable device or an Internet of Things (IoT) device.

Example 8 is a tangible, non-transitory, computer-readable medium comprising instructions that, when executed by a processor, direct the processor to control a wireless charging device. The computer-readable medium includes instructions that control the processor to broadcast wireless power to enable a power harvesting device to activate; receive, from the power harvesting device, information that enables transmission of a targeted power packet to the power harvesting device through beamforming; and transmit the targeted power packet to the power harvesting device.

Example 9 includes the computer-readable medium of example 8, including or excluding optional features. In this example, the information that enables the transmission of targeted power packet to the power harvesting device through beamforming is location information received from the power harvesting device.

Example 10 includes the computer-readable medium of any one of examples 8 to 9, including or excluding optional features. In this example, the information that enables transmission of the targeted power packet to the power harvesting device through beamforming is characteristics of a signal received by an antenna array from the power harvesting device.

Example 11 includes the computer-readable medium of any one of examples 8 to 10, including or excluding optional features. In this example, the computer-readable medium includes instructions to generate a schedule of time slots to be broadcast to the power harvesting device. Optionally, the power harvesting device randomly selects one of the time slots to transmit power harvester identification information to be received by the processor. Optionally, the computer-readable medium includes instructions to control the processor to broadcasts a power waveform to power the power harvesting device prior to each of the time slots. Optionally, the computer-readable medium includes instructions to control the processor to encode the power harvester identification information received during a previous one of the time slots into the power waveform.

Example 12 includes the computer-readable medium of any one of examples 8 to 11, including or excluding optional features. In this example, the computer-readable medium is included in a wireless network access device.

Example 13 includes the computer-readable medium of any one of examples 8 to 12, including or excluding optional features. In this example, the computer-readable medium is included in a device selected from a group that includes a laptop computer, a desktop computer, a tablet computer, and a smart phone.

Example 14 includes the computer-readable medium of any one of examples 8 to 13, including or excluding optional features. In this example, the power harvesting device is a wearable device or an Internet of Things (IoT) device.

Example 15 is a method of forming a wireless RF power harvesting and data network. The method includes broadcasting wireless power to enable a power harvesting device to activate; receiving information from the power harvesting device that enables transmission of a targeted power packet to the power harvesting device through beamforming; and transmitting the targeted power packet to the power harvesting device.

Example 16 includes the method of example 15, including or excluding optional features. In this example, the information that enables the transmission of the targeted power packet to the power harvesting device through beamforming is location information received from the power harvesting device.

Example 17 includes the method of any one of examples 15 to 16, including or excluding optional features. In this example, the information that enables the targeted power packet to be transmitted to the power harvesting device through beamforming is characteristics of a signal received by an antenna array from the power harvesting device.

Example 18 includes the method of any one of examples 15 to 17, including or excluding optional features. In this example, the method includes broadcasting a schedule of time slots to the power harvesting device. Optionally, the power harvesting device randomly selects one of the time slots to transmit power harvester identification information. Optionally, the method includes broadcasting a power waveform prior to each of the time slots, each power waveform to power the power harvesting device. Optionally, the method includes encoding the power harvester identification information received during a previous one of the time slots into the power waveform.

Example 19 includes the method of any one of examples 15 to 18, including or excluding optional features. In this example, the method is performed by a wireless network access device.

Example 20 includes the method of any one of examples 15 to 19, including or excluding optional features. In this example, the method is performed by a device selected from a group that includes a laptop computer, a desktop computer, a tablet computer, and a smart phone.

Example 21 includes the method of any one of examples 15 to 20, including or excluding optional features. In this example, the power harvesting device is a wearable device or an Internet of Things (IoT) device.

Example 22 is an apparatus to form a wireless RF power harvesting and data network. The apparatus includes means for broadcasting wireless power to enable a power harvesting device to activate; means for receiving information from the power harvesting device that enables the transmission of a targeted power packet to the power harvesting device through beamforming; and means for transmitting the targeted power packet to the power harvesting device.

Example 23 includes the apparatus of example 22, including or excluding optional features. In this example, the information that enables the transmission of the targeted power packet to the power harvesting device through beamforming is location information received from the power harvesting device.

Example 24 includes the apparatus of any one of examples 22 to 23, including or excluding optional features. In this example, the information that enables the transmission of the targeted power packet to the power harvesting device through beamforming is characteristics of a signal received by an antenna array from the power harvesting device.

Example 25 includes the apparatus of any one of examples 22 to 24, including or excluding optional features. In this example, the apparatus includes means for broadcasting a schedule of time slots to the power harvesting device. Optionally, the power harvesting device randomly selects one of the time slots to transmit power harvester identification information. Optionally, the apparatus includes means for broadcasting a power waveform prior to each of the time slots, each power waveform to power the power harvesting device. Optionally, the apparatus includes means for encoding the power harvester identification information received during a previous one of the time slots into the power waveform.

Example 26 includes the apparatus of any one of examples 22 to 25, including or excluding optional features. In this example, the apparatus is a wireless network access device.

Example 27 includes the apparatus of any one of examples 22 to 26, including or excluding optional features.

In this example, the apparatus is a device selected from a group that includes a laptop computer, a desktop computer, a tablet computer, and a smart phone.

Example 28 includes the apparatus of any one of examples 22 to 27, including or excluding optional features. In this example, the power harvesting device is a wearable device or an Internet of Things (IoT) device.

Example 29 is a system to form a wireless charging and data network, the system. The system includes an antenna array; and a controller to: broadcast wireless power to enable a power harvesting device to activate; receive, from the power harvesting device, information that enables a targeted power packet to be transmitted to the power harvesting device through beamforming; and transmit the targeted power packet to the power harvesting device.

Example 30 includes the system of example 29, including or excluding optional features. In this example, the information that enables the targeted power packet to be transmitted to the power harvesting device through beamforming is location information received from the power harvesting device.

Example 31 includes the system of any one of examples 29 to 30, including or excluding optional features. In this example, the information that enables the targeted power packet to be transmitted to the power harvesting device through beamforming is characteristics of a signal received by an antenna array from the power harvesting device.

Example 32 includes the system of any one of examples 29 to 31, including or excluding optional features. In this example, the controller is to generate a schedule of time slots and broadcast the schedule of time slots to the power harvesting device. Optionally, the power harvesting device randomly selects one of the time slots to transmit power harvester identification information to be received by the processor. Optionally, the controller is to broadcast a power waveform to power the power harvesting device prior to each of the time slots. Optionally, the controller is to encode the power harvester identification information received during a previous one of the time slots into the power waveform.

Example 33 includes the system of any one of examples 29 to 32, including or excluding optional features. In this example, the system is included in a wireless network access device.

Example 34 includes the system of any one of examples 29 to 33, including or excluding optional features. In this example, the system is included in a device selected from a group that includes a laptop computer, a desktop computer, a tablet computer, and a smart phone.

Example 35 includes the system of any one of examples 29 to 34, including or excluding optional features. In this example, the power harvesting device is a wearable device or an Internet of Things (IoT) device.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device to provide a wireless RF power harvesting and data network, the electronic device comprising:
    an antenna array;
    a processor; and
    a controller to control the processor to:
        perform a registration process for a power harvesting device to obtain information that enables transmission of a targeted power packet to the power harvesting device through beamforming, wherein the registration process comprises broadcasting a schedule of time slots to be used by the power harvesting device; and
        cause the targeted power packet to be transmitted to the power harvesting device.

2. The electronic device of claim 1, wherein the information that enables transmission of the targeted power packet to the power harvesting device through beamforming is location information received from the power harvesting device.

3. The electronic device of claim 1, wherein the information that enables transmission of the targeted power packet to the power harvesting device through beamforming is characteristics of a signal received by the antenna array from the power harvesting device.

4. The electronic device of claim 1, wherein the power harvesting device randomly selects one of the time slots to send power harvester identification information to the electronic device.

5. The electronic device of claim 4, wherein, prior to each of the time slots, the electronic device broadcasts a power waveform to power the power harvesting device.

6. The electronic device of claim 5, wherein the power harvester identification information received during a previous one of the time slots is encoded in the power waveform.

7. The electronic device of claim 1, wherein the electronic device is a wireless network access device.

8. The electronic device of claim 1, wherein the electronic device is a device selected from a group that includes a laptop computer, a desktop computer, a tablet computer, and a smart phone.

9. The electronic device of claim 1, wherein the power harvesting device is a wearable device or an Internet of Things (IoT) device.

10. A tangible, non-transitory, computer-readable medium comprising instructions that, when executed by a processor, direct the processor to control a wireless charging device, the instructions to control the processor to:
    determine a schedule of time slots for broadcasting to a power harvesting device;
    broadcast wireless power to enable the power harvesting device to activate;
    receive, from the power harvesting device, information that enables transmission of a targeted power packet to the power harvesting device through beamforming; and
    transmit the targeted power packet to the power harvesting device.

11. The computer-readable medium of claim 10, wherein the information that enables transmission of the targeted power packet to the power harvesting device through beamforming is location information received from the power harvesting device.

12. The computer-readable medium of claim 10, wherein the information that enables transmission of the targeted power packet to the power harvesting device through beamforming is characteristics of a signal received by an antenna array from the power harvesting device.

13. The computer-readable medium of claim 10, wherein the power harvesting device randomly selects one of the time slots to transmit power harvester identification information to be received by the processor.

14. The computer-readable medium of claim 13, comprising instructions to control the processor to broadcasts a power waveform to power the power harvesting device prior to each of the time slots.

15. The computer-readable medium of claim 14, comprising instructions to control the processor to encode the power harvester identification information received during a previous one of the time slots into the power waveform.

16. The computer-readable medium of claim 10, wherein the computer-readable medium is included in a wireless network access device.

17. The computer-readable medium of claim 10, wherein the computer-readable medium is included in a device selected from a group that includes a laptop computer, a desktop computer, a tablet computer, and a smart phone.

18. The computer-readable medium of claim 10, wherein the power harvesting device is a wearable device or an Internet of Things (IoT) device.

19. A method comprising:
   determining a schedule of time slots for broadcasting to a power harvesting device;
   broadcasting wireless power to enable the power harvesting device to activate;
   receiving information from the power harvesting device that enables transmission of a targeted power packet to the power harvesting device through beamforming; and
   transmitting the targeted power packet to the power harvesting device.

20. The method of claim 19, wherein the information that enables the transmission of targeted power packet to the power harvesting device through beamforming is location information received from the power harvesting device.

21. The method of claim 19, wherein the information that enables the transmission of targeted power packet to the power harvesting device through beamforming is characteristics of a signal received by an antenna array from the power harvesting device.

22. The method of claim 19, wherein the power harvesting device randomly selects one of the time slots to transmit power harvester identification information.

* * * * *